United States Patent
Chapon et al.

(10) Patent No.: US 7,237,372 B2
(45) Date of Patent: Jul. 3, 2007

(54) INTRODUCING DEVICE (75) Inventors: Emmanuel Chapon, Champvans (FR); Jean Viaud, Gray (FR); Fabien Chapron, Suippes (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/377,785

(22) Filed: Mar. 16, 2006

(65) Prior Publication Data

US 2006/0237140 A1  Oct. 26, 2006

(30) Foreign Application Priority Data

Apr. 2, 2005 (DE) ...................... 10 2005 015 224

(51) Int. Cl.
*B65B 41/12* (2006.01)
(52) U.S. Cl. ...................... 53/587; 53/389.2
(58) Field of Classification Search ............... 53/118, 53/211, 389.1, 389.2, 389.3, 587; 242/312, 242/564.4, 564.5
See application file for complete search history.

(56) References Cited

U.S. PATENT DOCUMENTS 4,604,848 A * 8/1986 Clostermeyer ............... 53/118
4,691,503 A * 9/1987 Frerich ......................... 53/587
4,956,960 A * 9/1990 Anstey et al. ................. 53/118
5,181,368 A * 1/1993 Anstey et al. ................. 53/587
5,687,548 A * 11/1997 McClure et al. .............. 53/399
5,974,764 A * 11/1999 Anstey et al. ................. 53/118
6,029,420 A    2/2000 Tertilt et al.
6,272,816 B1* 8/2001 Viaud et al. ................... 53/587

FOREIGN PATENT DOCUMENTS

DE    33 27 042    7/1983
EP    1 099 366    11/2000

OTHER PUBLICATIONS

European Search Report, Jul. 18, 2006, 14 Pages.

* cited by examiner

*Primary Examiner*—Sameh H. Tawfik
*Assistant Examiner*—Paul Durand (57) ABSTRACT An introduction device for introducing a roll of wrapping material to a wrapping device includes a support for supporting a roll of wrapping material, the support being movable between a loading position and an operating position, an actuating device having a pivotable pressure arm and a roller mounted onto the pivotable pressure arm, the actuating device adapted to pivot the pressure arm and bring the roller into contact with and to exert pressure onto the roll of wrapping material during the wrapping operation, and a device for activating the actuating device based upon the position of the support.

6 Claims, 5 Drawing Sheets

INTRODUCING DEVICE

BACKGROUND OF THE INVENTION

1. Technical Field

The invention relates to an introduction device for introducing a wrapping material into a wrapping device, such as a round baling press used to produce generally cylindrical bales.

2. Background of the Invention

Various devices are known wherein a wrapping material roll can be inserted into a wrapping device. In one such known device, a roll of wrapping material is deposited onto a support which is capable of bringing the roll into an operating position.

The underlying problem of known devices is the need for additional manual intervention after the initial insertion of the wrapping material roll in order to make the wrapping device operationally ready. Therefore, there is a need for an introduction device for a wrapping device that eliminates further manual intervention of the wrapping material roll after the initial insertion and before the wrapping device is operationally ready.

BRIEF SUMMARY OF THE INVENTION

An introduction device for introducing a roll of wrapping material to a wrapping device includes a support for supporting a roll of wrapping material, the support being movable between a loading position and an operating position. An actuating device includes a pivotable pressure arm and a roller mounted onto the pivotable pressure arm. The actuating device is adapted to pivot the pressure arm and bring the roller into contact with and to exert pressure onto the roll of wrapping material during the wrapping operation. A device activates the actuating device based upon the position of the support.

The introduction device is brought into an operationally ready condition merely by movement of the support. This advantage simplifies operation, ensures that when the support is moved upward the introduction device is operationally ready, and saves time. The relation between the support and the actuating device may be accomplished mechanically, electrically, and/or hydraulically, with the use of switches or mechanical follower members. The roller is advanced by the actuating device via a pressure arm to insure that the wrapping material roll does not deviate from its operating position, and to insure that a compressive force is exerted on the wrapping material, which results in a desired tension during operation. The pressure roller can be free-running or may have a brake or may be motor-driven.

The motor-driven displacement of the support affords particular advantage if the support is heavy and/or is difficult to access. The motor-driven displacement may also influence control means, such as feedback control, and may be adjusted to the given situation.

The utilization of idle movement in the connection between the actuating device and the support enables the support to be brought from its loading position to its operating position without the actuating device being immediately actuated. Rather, the actuating device is activated only if a particular action is executed. Such idle movement may be provided by means of a bearing guided in a slot, or by means of a spring, or free-running clutch or other range-bound swinging device. Depending on the circumstances, the idle movement can occur in two directions or only in one direction.

An actuating device can be positioned at a dead center, or neutral position, wherein it is inactive, and prevents undesired movement. Alternatively, the actuating device may be urged into a neutral position by springs, wherein the actuating device itself utilizes pneumatic spring action, and the stored energy is released on either side of the neutral position. If the actuating device can be operated on both sides of the neutral position, swinging movement of the pressure arm in either the clockwise or counterclockwise direction is achieved.

Operation of the wrapping material roll is assisted by a plate that secures the roll of wrapping material onto the support and insures that the roll of wrapping material comes into position against the driven roll, which accomplishes the unwinding of the wrapping material. The plate can be realized in a number of ways, i.e. the plate may be straight, curved, or bent, the plate may or may not have a frictional surface, and it may be rigid or flexible and may have an uninterrupted or perforated surface.

Movement of the roll of wrapping material onto the support can be controlled in a simple fashion by a parallelogram linkage on the support. The parallelogram linkage includes a cradle and a roller support, thereby preventing tipping movement which otherwise might cause the roll of wrapping material to roll off of the support.

A roll-type supporting of simple design is comprised of a supporting roller and a plate, which in combination serve to support the wrapping material roll, and which together comprise a component unit.

A gap may be provided between the support roll and the plate. The gap would accommodate a drivable roll of the wrapping device, onto which the roll of wrapping material can be placed in the operating state. The system can be arranged such that when the roll of wrapping material is placed onto the drivable roll, the roll of wrapping material is lifted off the plate, thus enabling the roll of wrapping material to rotate freely on the drivable roll and the support roller and facilitating the smooth movement of the wrapping material.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF THE INVENTION

Figure 1:
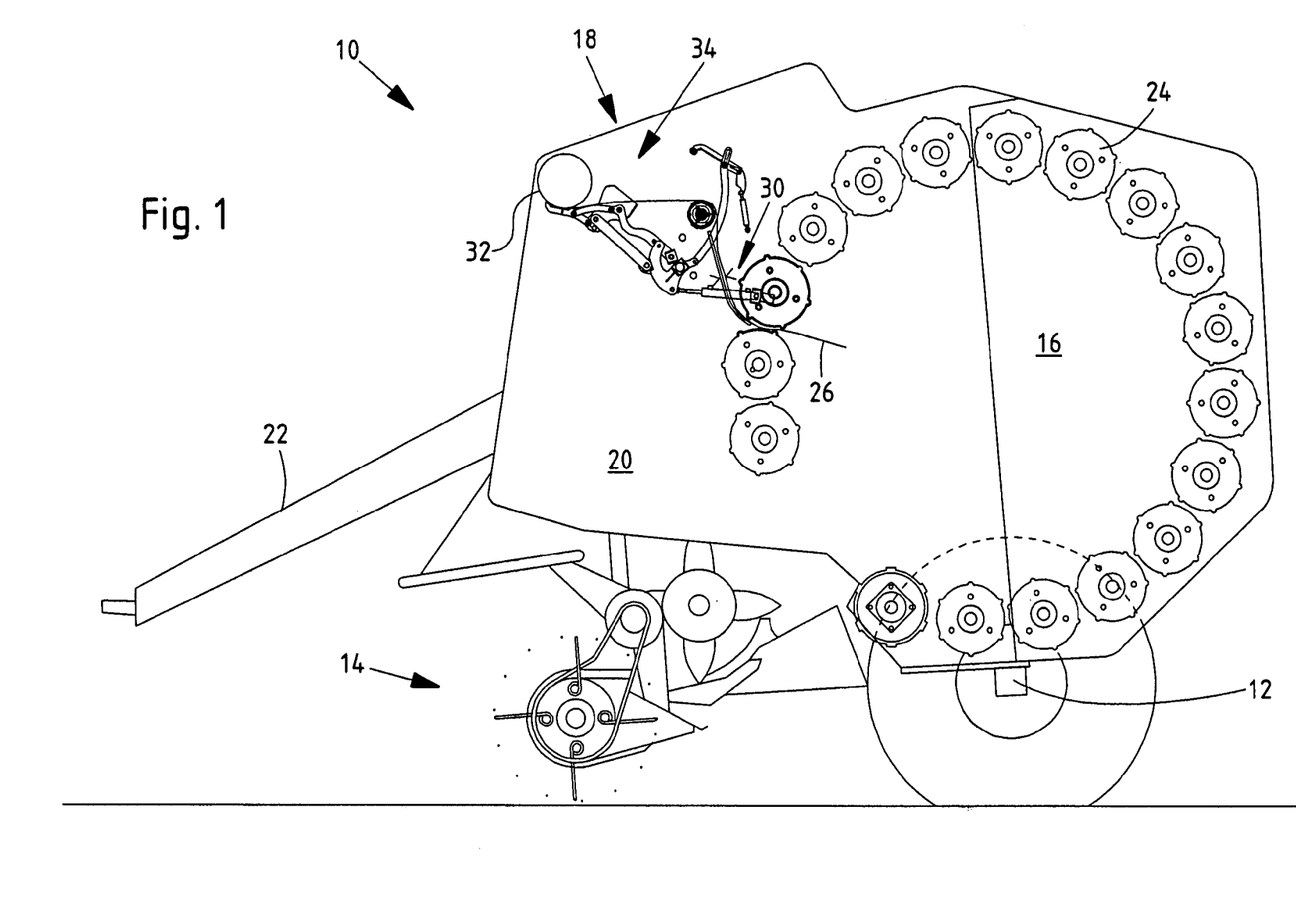
FIG. 1 is a side view of a round baling press with a wrapping device in accordance with the present invention.

Referring to FIG. 1, a round baling press 10 having a wrapping device 18 in accordance with the present invention is generally shown. The baling press 10 includes a chassis 12, a crop material feed device 14, a pressing chamber 16, and a wrapping device 18.

The round baling press 10 is generally representative of a class of presses which deliver pressed products that can be wrapped with wrapping material. The press 10 may be used in agriculture or general industry, for materials to be baled such as crop materials, refuse, paper, fabric, cotton, tobacco, etc., particularly materials which can be formed into round bales. The illustrated configuration of the press 10 with fixed chamber dimensions is provided merely for purposes of example; alternatively, the round baling press 10 may have a pressing chamber 16 with variable dimensions or with a mixed design. Fundamentally, the use of the wrapping device 18 may be in any mechanism where it is desired to wrap (or cover) an article with a wrapping material dispensed from a roll, independently of whether a press is present.

The chassis 12 has a frame (not shown) and an axle with wheels. The frame bears side walls 20 and a tow shaft 22, in customary fashion. The tow shaft 22 extends, approximately horizontally, from the front end region of the chassis 12 to a towing vehicle (not shown).

The crop material feed device 14 is generally representative of a class of devices that feed the material to be pressed into the pressing chamber 16. The crop feed material device 14 is disposed below the tow shaft 22 generally toward the front of the press 10.

The pressing chamber 16 extends between the two side walls 20 and, as shown, is surrounded by a plurality of rolls 24 arrayed in a circle. In its forward region, the circle of rolls 24 has an upper gap for the wrapping device 18 and a lower gap for the introduction of material from the crop material feed device 14.

The wrapping device 18 is employed to introduce wrapping material 26 in the form of film, netting, paper, or the like into the pressing chamber 16 and to wrap it around a pressed product. The wrapping device 18 may be disposed at virtually any location with respect to the round baling press 10. Advantageously, the positioning of the wrapping device 18 is selected such as to facilitate access to the device by operating personnel.

As shown, the wrapping device 18 is disposed in the forward region of the chasses 12, above the tow shaft 22, and is configured such that it delivers the wrapping material 26 into the pressing chamber 16 through the gap between two adjacent rolls 24. In the region of this gap, a driven roll 28 is provided to feed the wrapping material 26, along with a separating or cutting device 30 for detaching the wrapping material. The wrapping material 26 is provided wound onto a wrapping material roll 32. The wrapping device 18 has an introduction device 34 which will be described hereinbelow with reference to FIGS. 2, 3, 4, and 5.

Figure 2:
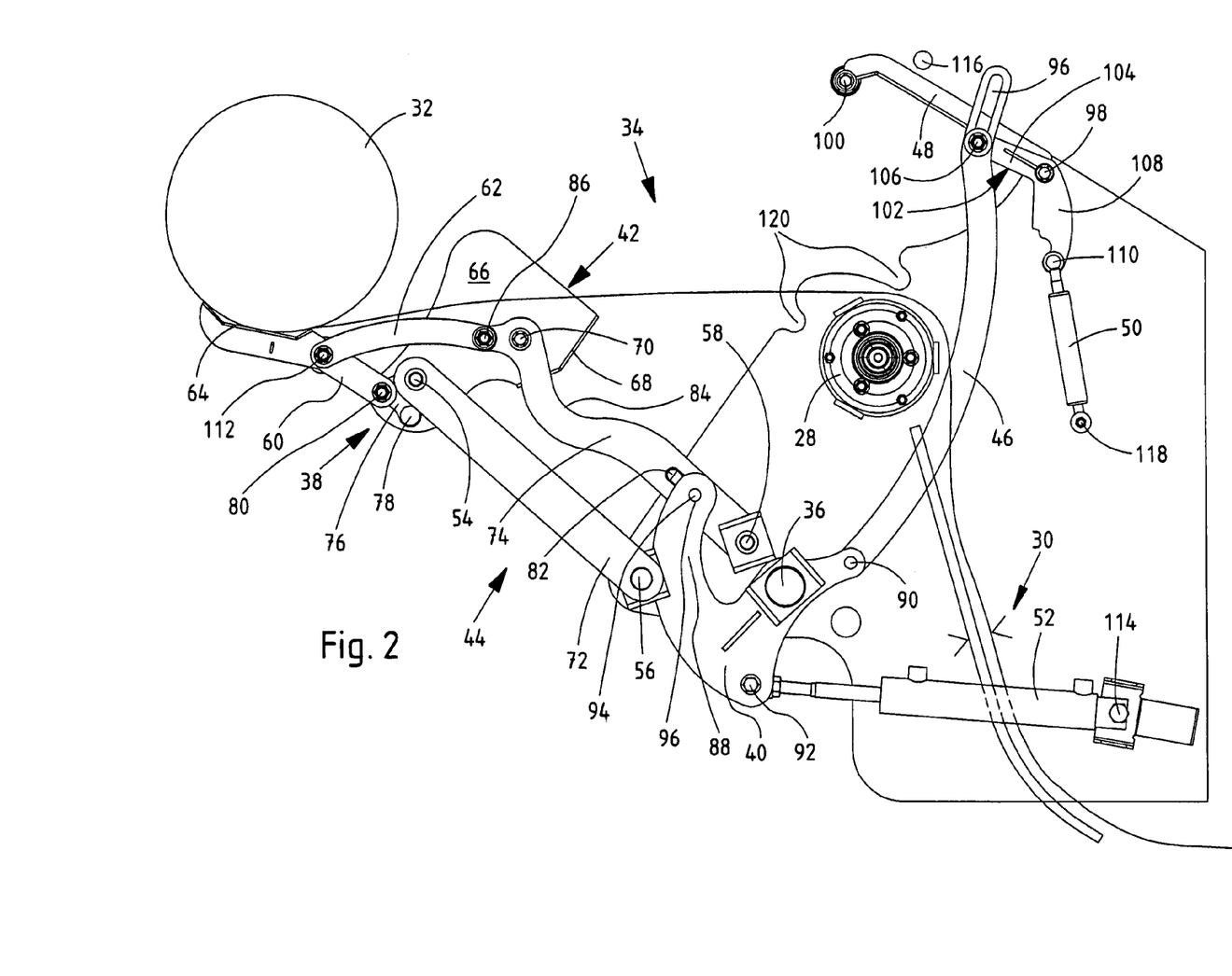
FIG. 2 is an enlarged view of a portion of FIG. 1, showing the wrapping device in a loading position.

Referring to FIG. 2, the wrapping device 18 and the associated introduction device 34 are shown in a loading position. The following components are shown: a bearing 36, a support 38, a positioning member 40, a roll support 42 for supporting the wrapping material roll, a linkage 44, a link member 46, a pressure arm 48, a first actuating device 50, a second actuating device 52, and a movable supporting roller 54 for providing part of the support for the wrapping material roll.

The introduction device 34 is devised and disposed such that it is easy and convenient for an operating person to install a roll of wrapping material 32 on the support 38. The roll can be brought into an operating position by means of or with the aid of a second actuating device 52, and can be made ready for operation by means of the first actuating device 50.

The bearing 36 is formed from a throughgoing shaft, gudgeon or the like, which defines a swing axis (or rotational axis) extending transversely to the direction of travel, disposed parallel to, forward, and below the rotational axis of the roll 28.

The support 38 may be comprised of steel or plastic material, but it must be sufficiently strong to support and transport the wrapping material roll 32. Preferably, the support 38 is an assembly positioned between the two lateral walls 20 and is pivotable around two bearings 56, 58. The support 38 includes the roll support 42 and the linkage 44, as well as a first link rod 60, a second link rod 62, and a support member 64.

The positioning member 40 is in the form of a plate, which in its interior is pivotally mounted on the bearing 36. The positioning member 40 includes three bearings 90, 92, 94. These bearings 90, 92, 94 may comprise pivot bolts, screws, rods, or similar form-interlocking connecting elements. The bearing 90 serves to pivotally connect the positioning member 40 to the link member 46. The bearing 92 serves to pivotally connect the positioning member 40 to the second actuating device 52. The positioning member includes an arm 88, and the bearing 94 serves to connect a distal end of the arm 88 to a positioning member 74 via a rod 96 which passes through, and engages a slot 82 in the positioning member 74. The arm 88 does not extend radially with respect to the bearing 36 but partially extends in a circular arc around the bearing 36. As such, even when the positioning member 40 is in an extreme position of its pivotal movement, the arm 88 does not collide with the bearing 58.

The roll support 42 has two parallel lateral surfaces 66 which are interconnected, preferably by a weld, by plate 68. The lateral surfaces 66 each have a bearing 70 and extend parallel to, and at a distance from, the respective lateral walls 20. The plate 68 has a bend of approximately twenty degrees, and for all positions of the roll support 42, the plate 68 is oriented at approximately forty-five degrees upward from horizontal. Plate 68 aids in insuring that the wrapping material roll 32 does not roll off of the roll support 42 and does not move to a position in which the wrapping operation is impossible. Plate 68 is on the side of the support 38 which is opposite to the location of the support member 64.

The linkage 44 is configured as a parallelogram-shaped linkage mechanism, comprised of a guide link 72 and a positioning link 74. Preferably, such a linkage 44 is provided on each side of the introduction device 34.

Figure 3:
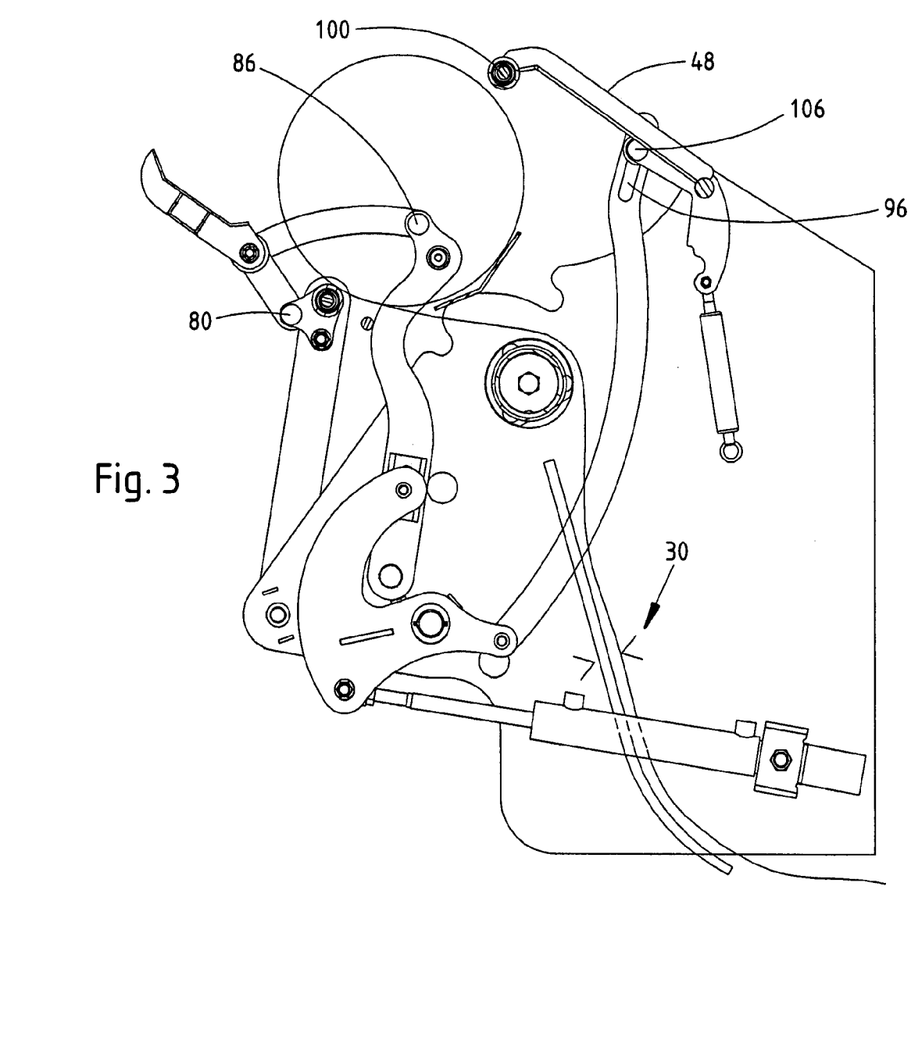
FIG. 3 is an view similar to FIG. 2, wherein the wrapping device is shown in an intermediate position between the loading position and an operating position.

The guide link 72 is in the form of a simple flat bar having a lower end region that is pivotally connected to the bearing 56, and an upper end region that engages a connecting plate 76, as shown in FIG. 3. The connecting plate 76 has a substantially triangular shape, and is pivotally mounted to the guide link 72 by the movable supporting roller 54. A screw 78 may be screwed into the connected plate 76 and a bearing 80 for the first link rod 60 is provided. The bearing 80 may comprise a bolt, a screw, or the like. The screw 78 serves to secure the connecting plate 76 to the roll support 42.

The positioning member 74 has nearly the same length as the guide link 72, but also has a slot 82 and a deflected region 84. The positioning member 74 is pivotally mounted at its lower end region to the bearing 58, and on its upper end region it is connected to the roll support 42, via the bearing 70. Thus, the above-mentioned linkage 44 is comprised of the guide link 72, the positioning member 74, the bearings 56, 58, 70, and the supporting roller 54. The slot 82 extends in the longitudinal direction of the positioning member 74, near the lower end region of the member 74. The deflected region 84 is relatively close to the bearing 70, and its open part is directed generally toward the roll 28, wherein in a particular out-swung position the open part of the deflected region may partially extend around the roll 28. A second bearing 86 is positioned close to the bearing 70 in the upper end region of the positioning member 74.

The link member 46 is in the form of a curved flat bar with a large radius of curvature. The radius of curvature is not necessarily uniform. The bar is pivotally mounted at its lower end region on the bearing 90. An upper region of the bar includes a slot 96 which extends substantially in the direction of the longitudinal axis of the bar and is typically maintained in a vertical position. The curvature is concave with respect to the roll 28.

The pressure arm 48 is pivotally mounted on a bearing 96. On an end region of the pressure arm 48, distant from the bearing 98, the pressure arm 48 is connected to a shaft on which a roller 100 is rotatably mounted. The roller 100 extends parallel to the roll 28 and is disposed such that it can be placed against the circumferential outer surface of the roll of wrapping material 32. The pressure arm 48 is in the form of a welded structure of approximately rectangular shape, and depending on the operating situation, it can assume positions from slightly below horizontal to slightly above horizontal. The bearing 98 may be in the form of a shaft which is rotatably mounted in the side walls 20 or on which the pressure arm 48 can pivot. The pressure arm 48 is also provided with a two-legged member or crank arm 102 which is rigidly connected to the pressure arm 48 at the bearing 98. An upper leg 104 has a bearing 106 in a free end region thereof, the bearing 106 may be in the form of a pin that extends through the slot 96. A lower leg 108 extends at an oblique angle of approximately one hundred and thirty-five degrees with respect to the upper leg 104, and has a bearing 110 in a free end region thereof. This bearing 110 may be in the form of a simple screw. The bearing 98 is disposed, and the pressure arm 48 is dimensioned and shaped, such that roller 100 can be applied against the peripheral surface of the roll of wrapping material 32 and can follow the surface during the wrapping operation despite the decreasing diameter of the roll 32.

The actuating device 50, as shown, is in the form of a pneumatic cylinder that applies spring-like force. Alternatively, a mechanical spring may be provided, such as a helical compression spring. Further, the actuating device 50 could be a hydraulic or an electric motor. The actuating device 50 is held at its upper end region in the bearing 110 on the arm 102; and at a lower end region thereof, is pivotally mounted on the chassis 12 or a side wall 20 via bearing 118. In all operating states the actuating device 50 is oriented generally vertically. The bearing 110 moves from a position to the right of an imaginary line through the bearings 98 and 118 to a position to the left of the imaginary line and back; meanwhile, the pressure arm 48 moves between the loading position and the operating position. The actuating device 50 a disposed such that it urges the arm 102 and the pressure arm 45 in a counterclockwise direction or a clockwise direction, on either site of a dead center, or neutral position.

The second actuating device, 52, is in the form of double-acting hydraulic cylinder, electric motor, or the like. On one end it is swingably mounted in a fixed bearing 114, and on the other end it is swingably held on bearing 92. The second actuating device 52 is disposed generally horizontally during all operating states.

The movable supporting roller 54 is rotatably mounted on the guide link 72, and swingably bears on its periphery or on a shaft, the roll support 42 and the connecting plate 76. The movable supporting roller 54 is disposed such that, together with the plate 68 or the roll 28, it can support the wrapping material roll 32 on two lines.

The length of the first link rod 60 is only about one fifth that of the guide link 72. At one end, the link rod 60 is mounted on the bearing 80 on the connecting plate 76, and at the other end the link rod 60 undergoes a transition to a side wall of the support member 64, with a bearing 112 being provided in the transition region.

The second link rod 62 is slightly curved, and always extends generally horizontally, connecting the bearings 112 and 86, thereby serving to control the position of the support member 64 with respect to the linkage 44.

The support member 64 is in the form of a cradle. It is wide enough and long enough to reliably accommodate the roll of wrapping material 32. When the support member 64 is in the loading position (FIG. 2), it is slightly inclined downwardly toward the roll 28, thereby preventing the roll of wrapping material 32 from rolling off. In its simplest embodiment, it is comprised of a welded assembly with two web members and three crossmembers.

Finally, a rigid detent 116 is provided above the pressure arm 48. An upper side of the pressure arm 48 can come to rest against the detent, thereby preventing the actuating device 50 from fully extending and thereby possibly sustaining damage over time.

Recesses 120 may be provided in the side wall 20. These recess may support the bearing 70, the supporting roller 54, the screw 78, or other components when the introduction device 34 is in its operating position to insure spatial stabilization of the introduction device 34 during the wrapping operation.

It is noted that the swing axis of all the bearings of the introduction device 34 are parallel to the rotational axes of the rolls/rollers 28, 54, and 100, and in the case of a round baling press 10 they are oriented horizontally, transversely to the direction of travel. The term "bearing" may typically be understood to mean a pivot pin, rod, shaft, screw, bolt, journal, spindle, gudgeon, trunnion, or the like, which rotates in a bore, recess, slot, or the like and/or is otherwise pivotably movable.

From the preceding, one arrives at the structure and functions which will now be described, starting with the "loading state" illustrated in FIG. 2.

In the loading state the second actuating device 52 is essentially retracted, and as a result:

(a) the positioning member 40 is pivoted counterclockwise;

(b) the link member 46 is pushed upward, such that, the bearing 106 abuts against the lower end of the slot 96, and the arm 102 is pivoted widely (clockwise) around the bearing 98, whereby the line of action of the actuating device 50 passes to the left of the bearing 98 and extends to intersect the side of the pressure arm 48, and the pressure arm 48 is forced upward to abut the detent 116;

(c) the positioning member 74 and guide link 72 are swung counterclockwise around the bearing 58, wherein the bearing 94 slides in the slot 82 of the positioning member 74;

(d) the roll support 42, along with the positioning member 74 and the guide link 72, are pivoted away from the roll 28; and (e) the support member 64 is brought into a roughly horizontal orientation, as a result of its connection to the positioning member 74 via the second link rod 62.

In this loading position, a roll of wrapping material 32 can be placed on the support member 64; and the roller 100 and the pressure arm 48 are raised up such that the roll of wrapping material 32 can now be placed against the roll 28.

From this loading position, the roll of wrapping material 32 can be brought into the operating position, wherein the wrapping material 26 can be withdrawn from the roll 32 under tension. For this purpose, the second actuating device 52 is extended, with the following initial results:

(a) the positioning member 40 is pivoted clockwise around its bearing 36, wherein the linkage 44 is also pivoted around the bearings 56 and 58 such that the roll support 42 is moved toward the roll 28; and (b) the support member 64 is pivoted clockwise around the bearing 80 as a result of its connection to the positioning member 74 via the second link rod 62, such that the roll of wrapping material 32 is caused to roll off of the support member 64 and onto the supporting roller 54 and the plate 68, as shown in FIG. 3.

Figure 4:
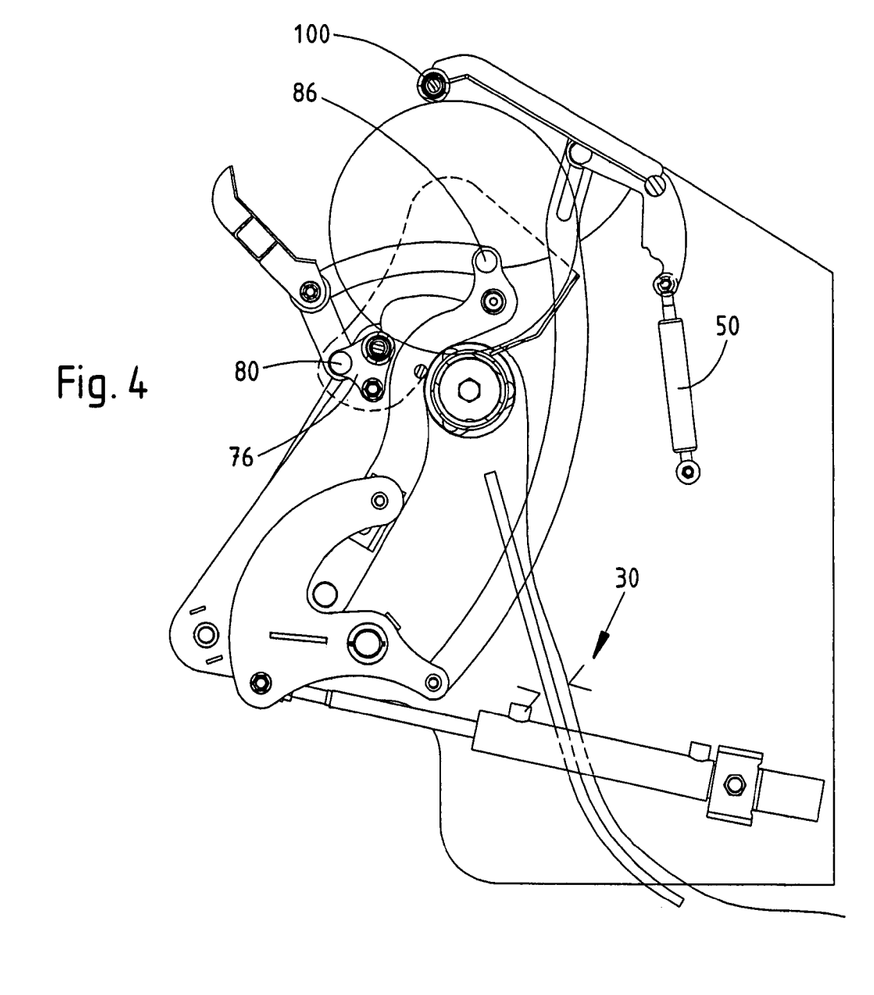
FIG. 4 is a view similar to FIGS. 2 and 3, wherein the wrapping device is shown in the operating position.

When the introduction device 34 approaches its operating position, as illustrated in FIG. 4, the gap between the supporting roller 54 and the plate 68 will extend over the roll 28, whereby the roll of wrapping material 32 will come to be supported by the roll 28 and the supporting roller 54, and the plate 68 will be moved further downwardly and will separate itself from contact with the outer circumference of the roll of wrapping material 32.

In the transition from intermittent state shown in FIG. 3, to the operating position shown in FIG. 4, the positioning member 40 pulls the link member 46 downward, such that the bearing 106 comes into contact with the upper end of the slot 96. Consequently, the pressure arm 48 is pivoted counterclockwise around the bearing 98, and the roller 100 is moved downward. During this movement, the actuating device 50 is retracted. As soon as the bearing 110 departs from the straight line through bearings 118 and 98, with the actuating device 50 at its shortest extension, the actuating device 50 is extended and presses the pressure arm 48 downward, counterclockwise, around the bearing 98.

In this way, the roller 100 comes into contact with the outer surface of the roll of wrapping material 32 and exerts a compressive force on the roll 32 to secure the roll 32 on the supporting roller 54 and the roll 28, and also to exert friction on the wrapping material being withdrawn. The actuating device 50 is activated as soon as the support 38 reaches a certain position.

Figure 5:
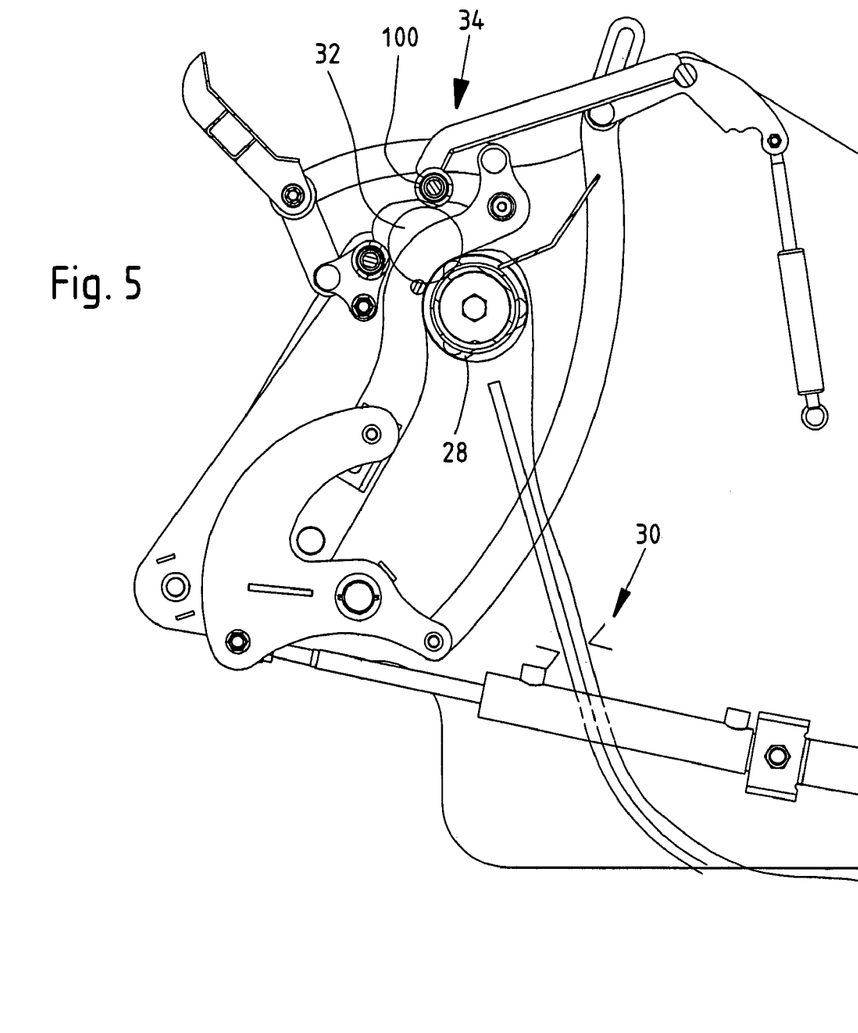
FIG. 5 is a view similar to FIG. 4, wherein the wrapping device is shown in the operating position and the roll of wrapping material on the support is nearly empty.

The slot 96 provides sufficient play to the bearing 106 to allow the roller 100 to follow the decreasing outer diameter of the roll of wrapping material 32, as is shown in FIG. 5. Because the inclination of the longitudinal axis of the actuating device 50 increases, and thus the lateral distance between the bearing 110 and the bearing 98 increases, the compressive force exerted by the roller 100 on the roll of wrapping material 32 increases as the diameter of the roll 32 decreases.

In order to position the introduction device 34 in the loading state according to FIG. 2, and return the device 34 to the loading position, the second actuating device 52 is again retracted.

In accordance with the provisions of the patent statutes, the present invention has been described in what is considered to represent its preferred embodiment. However, it should be noted that the invention can be practiced otherwise than as specifically illustrated and described.

The invention claimed is:

1. An introduction device for introducing a roll of wrapping material to a wrapping device comprising;

a support for supporting a roll of wrapping material, the support being movable between a loading position and an operating position;

an actuating device including a pressure arm mounted for pivoting about a bearing, a roller mounted onto the pressure arm, and a first actuator coupled to said pressure arm in a manner establishing an over center relationship relative to said bearing, whereby said first actuator acts to yieldably retain said arm either in a non-operating position holding said roller away from a region to be occupied by said roll of wrapping material when the support is in its loading position, or in an operating position wherein said roller contacts and exerts pressure onto the roll of wrapping material during the wrapping operation when the support is in said operating position;

a device coupled between said support and said pressure arm for moving said pressure arm so as to cause said first actuator to move over center when said support is moved from said loading position to said operating position, and vice-versa and;

a second actuator coupled to said support for selectively moving said support between said loading and operating positions.

2. An introduction device for introducing a roll of wrapping material to a wrapping device comprising;

a support for supporting a roll of wrapping material, the support being movable between a loading position and an operating position;

an actuating device having a pivotable pressure arm and a roller mounted onto the pivotable pressure arm, the actuating device adapted to pivot the pressure arm and bring the roller into contact with and to exert pressure onto the roll of wrapping material during the wrapping operation; said actuating device can be positioned at a neutral position, wherein undesired movement of the pressure arm is prevented and movement of the actuating device to either side of the neutral position will pivot the pressure arm and move the roller; and a device for activating the actuating device based upon the position of the support.

3. An introduction device according to claim 1, wherein said support includes a support member upon which said roll of wrapping material may be placed when said support is in said loading position, a plate spaced from said support member when said support is in said loading position, and a linkage coupled to said support member for moving it such that said roll of wrapping material is deposited into engagement with said plate for securing the roll of wrapping material on the support as the support moves between the loading and operating positions.

4. An introduction device for introducing a roll of wrapping material to a wrapping device comprising;

a support for supporting a roll of wrapping material, the support being movable between a loading position and an operating position and including a support member upon which said roll of wrapping material may be placed when said support is in said loading position, a plate spaced from said support member when said support is in said loading position, and a parallelogram linkage including a support roll located between said support member and said plate and being coupled to said support member for moving the support member such that said roll of wrapping material is deposited into engagement with said plate and support roll for securing the roll of wrapping material on the support as the support moves between the loading and operating positions;

an actuating device having a pivotable pressure arm and a roller mounted onto the pivotable pressure arm, the actuating device adapted to pivot the pressure arm and bring the roller into contact with and to exert pressure onto the roll of wrapping material during the wrapping operation; and a device for activating the actuating device based upon the position of the support.

5. An introduction device according to claim 4, wherein the roll support includes a supporting roller, the supporting roller cooperating with the plate to support and secure the roll of wrapping material onto the support.

6. An introduction device according to claim 5, wherein the supporting roller and the plate are positioned at a distance from one another, thereby defining a gap therebetween, the gap being adapted to accommodate a drivable roll onto which the roll of wrapping material can be supported in the operating position.

* * * * *